United States Patent
Mihranyan

(10) Patent No.: US 11,253,821 B2
(45) Date of Patent: Feb. 22, 2022

(54) PREPARATION AND USE OF CELLULOSE NANOFIBER MEMBRANE

(71) Applicant: Albert Mihranyan, Uppsala (SE)

(72) Inventor: Albert Mihranyan, Uppsala (SE)

(73) Assignee: NVIGOREA AB, Uppsala (SE)

( * ) Notice: Subject to any disclaimer, the term of this patent is extended or adjusted under 35 U.S.C. 154(b) by 0 days.

(21) Appl. No.: 15/558,338

(22) PCT Filed: Mar. 18, 2015

(86) PCT No.: PCT/EP2015/055708
§ 371 (c)(1),
(2) Date: Sep. 14, 2017

(87) PCT Pub. No.: WO2016/146188
PCT Pub. Date: Sep. 22, 2016

(65) Prior Publication Data
US 2018/0065092 A1  Mar. 8, 2018

(51) Int. Cl.
| | | |
|---|---|---|
| *B01D 71/10* | (2006.01) | |
| *B01D 67/00* | (2006.01) | |
| *B01D 69/02* | (2006.01) | |
| *D21H 25/04* | (2006.01) | |
| *D21H 11/18* | (2006.01) | |

(Continued)

(52) U.S. Cl.
CPC ......... *B01D 71/10* (2013.01); *B01D 67/0004* (2013.01); *B01D 67/009* (2013.01); *B01D 67/0083* (2013.01); *B01D 69/02* (2013.01); *D21H 11/18* (2013.01); *D21H 17/02* (2013.01); *D21H 21/52* (2013.01); *D21H 25/04* (2013.01); *B01D 2323/283* (2013.01); *B01D 2323/30* (2013.01)

(58) Field of Classification Search
CPC .......... B01D 2323/283; B01D 2323/30; B01D 67/0004; B01D 67/0083; B01D 67/009; B01D 69/02; B01D 71/10; D21H 11/18; D21H 17/02; D21H 21/52; D21H 25/04
See application file for complete search history.

(56) References Cited

U.S. PATENT DOCUMENTS

| | | | |
|---|---|---|---|
| 3,540,598 A | 11/1970 | Guy | |
| 2007/0207692 A1* | 9/2007 | Ono | B01D 39/18 442/327 |

(Continued)

FOREIGN PATENT DOCUMENTS

| | | |
|---|---|---|
| JP | H08229317 | 3/1995 |
| JP | H08229318 | 3/1995 |

OTHER PUBLICATIONS

Metreveli et al, "A Size-Exclusion Nanocellulose Filter Paper for Virus Removal" Advanced Healthcare Materials, vol. 3, No. 10, Oct. 2014, pp. 1546-1550 (Year: 2014).*

(Continued)

*Primary Examiner* — Latosha Hines
(74) *Attorney, Agent, or Firm* — Ryan Kromholz & Manion S.C.

(57) ABSTRACT

A filtration membrane comprising cellulose fibres, the membrane having a pore size distribution such that the modal pore diameter is between 10 nm and 25 nm and/or wherein less than 5% of the pore volume comprises pores of greater than 40 nm and having a total porosity greater than 30%.

27 Claims, 5 Drawing Sheets

(51) Int. Cl.
*D21H 17/02* (2006.01)
*D21H 21/52* (2006.01)

(56) References Cited

U.S. PATENT DOCUMENTS

2010/0065236 A1* 3/2010 Henriksson ............ D21C 9/002
162/174
2010/0297436 A1* 11/2010 Mahan .................... C08K 9/02
428/332

OTHER PUBLICATIONS

Metreveli et al. "A Size-Exclusion Nanocellulose Filter Paper for Virus Removal". Advanced Healthcare Materials. Mar. 2014. vol. 3. 1546-1550 (Year: 2014).*
Mihranyan "Cellulose from Cladophorales Green Algae: From Environmental Problem to High-Tech Composite Materials". Journal of Applied Polymer Science. Sep. 2010. vol. 119. 2449-2460. (Year: 2010).*
Mihranyan "Cellulose from Cladophorales Green Algae: From Environmental Problem to High-Tech Composite Materials" Sep. 1, 2010. Journal of Applied Polymer Science. vol. 119. pp. 2449-2460 (Year: 2010).*
Hua et al. "Translational study between structure and biological response of nanocellulose from wood and green algae" Royal Society of Chemistry, Nov. 26, 2013, vol. 4. pp. 2892-2903 (Year: 2013).*
Mihranyan et al., Membrane characterization and solute diffusion in porous composite nanocellulose membranes for hemodialysis, Cellulose, 2013, 20(6), 2959-2970.
Mihranyan et al, Cellulose from Cladophorales green algae: from environmental problem to hi-tech composite materials, Jrnl of App Polymer Science, 2011, 119(4), 2449-2460.
Asper et al, A Removal of xenotropic murine leukemia virus by nanocellulose based filter paper, Biologicals, 2015, 43(6): 452-456.
Quellmalz et al, "Citric Acid Cross-Linked Nanocellulose-Based Paper for Size-Exclusion Nanofiltration", ACS Biomaterials Science & Engineering, vol. 1, No. 4, Feb. 2015, Abstract.
Metreveli et al, "A Size-Exclusion Nanocellulose Filter Paper for Virus Removal", Advanced Healthcare Materials, vol. 3, No. 10, Oct. 2014, pp. 1546-1550.
International Search Report dated Nov. 12, 2015, PCT/EP2015/055708; 4 pgs.
Written Opinion dated Sep. 22, 2016, PCT/EP2015/055708; 7 pgs.

* cited by examiner

PREPARATION AND USE OF CELLULOSE NANOFIBER MEMBRANE

BACKGROUND OF THE INVENTION

The present invention relates to paper such as filter paper, including filter paper having a narrow pore size distribution such as those suitable for removing microorganisms from fluids.

All protein based products derived from tissue cultures, human plasma, animals or plants possess the risk of viral contamination. The viral contamination is directly threatening the safety of the biotechnological products for end-users. First, viruses directly cause active infection, e.g. human immunodeficiency virus (HIV), hepatitis C virus (HCV). Second, even if they do not immediately cause infection and remain dormant for years, viruses possess high cancerogenic, e.g. human papilloma virus, avian leucosis virus, Kaposi sarcoma-associated herpes virus, and immunogenic, e.g. rubella virus (type 1 diabetes), torque teno virus (multiple sclerosis), parvovirus (rheumatoid arthritis), potential. Because viruses have a particle size only slightly larger than that of proteins, their separation from the fluid containing the mixture proteins and said viruses is particularly hard. Therefore, virus removal is an industrially important process, and virus removal filters are highly demanded.

Viruses can be removed from fluids by several means, including filtration (such as depth filtration or surface screening), partitioning and fractionation (such as by centrifugation), and chromatography (such as ion-exchange, affinity or gel-permeation chromatography). Alternatively, viruses within fluids can be inactivated by chemical means (such as chaotropic agents, low pH environments, solvents and detergents) or physical means (such as the provision of heat and/or irradiation). However, the use of physical means in particular is often associated with undesired damage to other components in the fluid. Furthermore, some viruses are hard to inactivate by chemical means and become resistant to deactivation, e.g. reovirus or SV40. Additionally, even if the virus is chemically deactivated the virus markers still remain in the solution, which makes the quality assurance and validation of the deactivation process troublesome. Accordingly, filtration and, especially, size-exclusion filtration is the preferred mode of removing a virus from a fluid because it is both non-destructive, i.e. does not compromise the integrity of the biolofical sample of interest, and non-interfering, i.e. does not cause immune reactions. It is also appealing because of low impact on protein's yield, integrity and functionality; inertness; adaptability to large range of products; avoidance of chemical resistance; flexibility and ease of use; virus removal predictability; ease of validation, i.e. removal of viral markers; and absence of toxic/mutagenic chemicals for inactivation. Another group of undesired biologically active particles capable of transfection and inducing disease are misfolded prion (protein) particles (PrPs). Unlike viruses, these PrPs lack genetic material and comprise only proteins, often of a particle size around 12 nm.

Several parameters may influence the efficiency of a virus filtration process. These include the size of the virus, the pore size distribution of the filter, the thickness of the filter, the tortuosity of the filter pores, the number of filter layers, any surface charge of the filter, the surface chemistry of the filter and virus as well as the pH of the fluid feed stream and its ionic strength. One method of virus filtration relies on the electrostatic trapping of viruses inside the filter because viruses possess an electrostatic charge of their own. This type of electrostatic interception filtration is not preferred for virus removal because it is highly dependent on pH, ionic strength, presence of surfactants and other molecules in the fluid. Different viruses have a different isoelectric point which varies greatly anywhere between 1.9 and 8.4. Considering that proteins of interest also feature a varying isoelectric point, it is not trivial to design robust filters, which remove a broad spectrum of viruses without affecting protein recovery. Therefore, size-exclusion virus filtration, which is not dependent on the processing parameters and only relies on the pore size distribution, is preferable.

Most viruses have a particle size in the range between 18 and 300 nm. For convenience, viruses are typically divided into two groups: large size viruses (those having diameters above 40 nm) and small size viruses (those having diameters in the range from 18 to 40 nm). Accordingly, most proteins typically have a particle size below 12 nm. As such, it is possible to separate viruses from proteins where both are suspended in a fluid by a size exclusion method.

Nonetheless, there are few materials that are currently used for virus filtration. Such materials typically include synthetic or semi-synthetic polymers (for example polyvinylidene difluoride (PVDF), cuprammonium-regenerated cellulose, cellulose acetate, polyethylenesulfone (PES), polycarbonate) and ceramic filters. The ceramic filters are usually non-disposable, heavy, brittle, and costly (often in the region of 10 times more expensive than synthetic polymer membranes). Accordingly, their use is less common than the use of polymer membranes.

The majority of virus removal filters are therefore formed from synthetic or semisynthetic polymers and are typically produced via phase-inversion processing, requiring hazardous solvents and coagulants with rigorously controlled processing parameters. Further, additional pore annealing is necessary to obtain desired narrow pore size distribution suitable for virus removal. In addition, the currently available polymeric virus removal filters are often two- or three-layered structures or manufactured as hollow fibres. The polymeric filters can further be symmetric, i.e. having uniform pore size distribution across the whole thickness, or asymmetric, i.e. having no uniform pore size distribution in different layers.

There is therefore a need for a filtration membrane which is suitable for the separation of viruses from fluids, such as fluids containing proteins, which membrane can be produced using relatively low cost materials in a simple method and without the use of hazardous materials.

SUMMARY OF THE INVENTION

According to a first aspect of the invention, there is provided a filtration membrane comprising cellulose fibres, the cellulose fibers comprising elementary fibrils of diameter greater than 10 nm, the membrane having a pore size distribution such that the modal pore diameter is between 10 nm and 20 nm and/or wherein less than 5% of the pore volume comprises pores of greater than 40 nm. Preferably, the cellulose fibres are derived from green filamentous algae.

In another aspect, the invention provides a filtration membrane comprising cellulose fibres derived from green filamentous algae, the membrane having a pore size distribution such that the modal pore diameter is between 10 nm and 20 nm and/or wherein less than 5% of the pore volume comprises pores of greater than 40 nm.

Preferably, the cellulose fibres have elementary fibrils of diameter greater than 10 nm and/or at least half of the cellulose has a degree of crystallinity greater than 90%.

In another aspect, the invention provides a filtration membrane comprising cellulose fibres, at least half of the cellulose having a degree of crystallinity greater than 90%, the membrane having a pore size distribution such that the modal pore diameter is between 10 nm and 20 nm and/or wherein less than 5% of the pore volume comprises pores of greater than 40 nm. Preferably, the cellulose fibres are derived from green filamentous algae and/or the cellulose fibres have elementary fibrils of diameter greater than 10 nm.

Preferably, at least half of the cellulose fibres are derived from algae Cladophorales and/or algae Siphonocladales orders. More preferably, at least a portion of the cellulose fibres are derived from algae *Cladaphora* species.

Preferably, as least 60%, e.g. at least 70%, at least 80% or at least 90% of the cellulose has a degree of crystallinity greater than 90%.

In some embodiments, at least half of the cellulose has a degree of crystallinity of at least 95%. Preferably, at least 60%, e.g. at least 70%, at least 80% or at least 90% of the cellulose has a degree of crystallinity greater than 95%.

In some embodiments, at least half of the cellulose fibres comprise elementary fibrils have a diameter greater than 15 nm, for example a diameter greater than 20 nm, e.g. from 20 nm to 30 nm. More preferably, at least 60%, e.g. at least 70%, at least 80% or at least 90% of the cellulose fibres have a diameter greater than 15 nm, for example a diameter greater than 20 nm, e.g. from 20 nm to 30 nm.

It is preferred that the modal pore diameter is between 10 nm and 25 nm, for example between 10 nm and 20 nm, e.g. around 11 nm, 13 nm or 15 nm. It is also preferred that the membrane is essentially free from pores of diameter greater than 40 nm.

Preferably, the total porosity of the membrane is at least 10%. More preferably, the total porosity of the membrane is greater than 20%, for example greater than 30%, e.g. between 30% and 60% or 30% and 50%.

In certain embodiments, the cellulose fibres are modified by a cross-linking agent. Non-limiting examples of cross-linking agents for cellulose include e.g. formaldehyde/urea, formaldehyde/melamine, formaldehyde/polyethyleimine, and polyamide/epichlorhydrine. The preferred cross-linking agent may further comprise environmentally friendly polycarboxylic acid cross-linkers, e.g. citric acid, 1,2,3,4-butanetetracarboxylic acid, preferably cured at temperatures between 100° C. and 200° C., more preferably at temperatures greater than 150° C., and preferably in the presence of a suitable catalyst e.g. sodium hypophosphate.

In a further aspect of the invention, there is provided a laminate material comprising a membrane according to the invention and a support. The support may comprise paper, such as paper made from plant-based cellulose. The support may, for example, comprise a filter paper of the prior art. The laminate structure can be produced via direct drying by applying heat and pressure or via using any of the cross-linking agents described above.

In another aspect, the invention provides a method of removing undesired particles and letting through particles of desired size from a feed fluid, the method comprising passing the feed fluid through a filtration membrane according to the invention so as to retain at least a portion of the particles on the membrane and produce a filtrate containing a lower concentration of the undesired particles than the feed fluid.

Preferably, the undesired particles have a diameter greater than 10 nm, for example a diameter greater than 12 nm, 18 nm, 20 nm, 30 nm, 40 nm, 100 nm, or 200 nm.

It is preferred that the undesired particles comprise microorganisms, such as viruses. However, in certain embodiments, the undesired particles may comprise proteins such as PrPs. For example, undesired virus particles typically have a diameter greater than 18 nm, while undesired prion particles have diameter of about 12 nm. Where the undesired particles are viruses, it is preferred that the method provides a virus removal probability log reduction value (LRV) or greater than 4, e.g. greater than 5 or 6.

It is preferred that the method provides a particle removal probability log reduction value (LRV) of greater than 1, e.g. greater than 2 for particles greater than 10 nm in diameter. It is also preferred that the method provides a LRV greater than 3 or 4 for particles greater than 18 nm or 20 nm in diameter. It is also preferred that the method provides an LRV greater than 5 or 6 for particles greater than 40 nm in diameter. For small viruses, it is preferred that the LRV is greater than 3. For large viruses it is preferable that the LRV is greater than 4. For prion particles it is preferred that the LRV removed infectivity is greater than 1 and more preferably greater than 3.

Preferably, the fluid is passed through the membrane under a pressure differential of approximately 10 to 600 kPa so that the integrity of the filter membrane is not compromised. The pressure differential may be applied either as overhead pressure (for example an overhead pressure of 10 to 600 kPa, e.g. 100 to 300 kPa) or as suctions pressure (for example at a suction pressure of 10 to 600 kPa, e.g. 10 to 40 kPa).

In a further aspect, the invention provides a method of isolating desired particles from a feed fluid, the method comprising passing the feed fluid through a filtration membrane according to any preceding claim so as to retain at least a portion of the particles on the membrane and produce a filtrate containing a lower concentration of the desired particles than the feed fluid. Such a method may be used to harvest particles from a production process, for example a process for the production of proteins or viruses for study or therapeutic purposes.

In this aspect, the desired particles preferably have a diameter greater than 10 nm, for example a diameter greater than 12 nm, 18 nm, 20 nm, 30 nm, 40 nm, 100 nm, or 200 nm.

It is preferred that the particles comprise microorganisms, such as viruses. However, in certain embodiments, the particles may comprise proteins such as PrPs. Where the undesired particles are viruses, it is preferred that the method provides a virus removal probability log reduction value (LRV) of greater than 1, more preferably greater than 3 for small viruses and preferably greater than 4 for large viruses as determined by the titre of the feed solution and the detection limit of the method. For PrPs the removed infectivity of greater than 1 log is provided, more preferably greater than 3 log.

It is preferred that the method provides a particle removal probability log reduction value (LRV) of greater than 1, e.g. greater than 2 for particles greater than 10 nm in diameter. It is also preferred that the method provides a LRV greater than 3 or 4 for particles greater than 18 nm or 20 nm in diameter. It is also preferred that the method provides an LRV greater than 5 or 6 for particles greater than 40 nm in diameter. For small viruses, it is preferred that the LRV is greater than 3. For large viruses it is preferable that the LRV is greater than 4. For prion particles it is preferred that the LRV removed infectivity is greater than 1 and more preferably greater than 3.

Preferably, the fluid is passed through the membrane under a pressure differential of approximately 10 to 600 kPa. The pressure differential may be applied as overhead pressure (for example an overhead pressure of 10 to 600 kPa, e.g. 100 kPa to 300 kPa) or as suction pressure (for example at a suction pressure of 10 to 600 kPa, e.g. 10 to 40 kPa).

Where desired particles are retained on the membrane, the method may further include the step of removing the desired particles from the membrane, e.g. for further use.

In a further aspect, the invention provides a method of manufacturing a filtration membrane of the present invention, the method comprising:
  (i) dispersing cellulose in a fluid,
  (ii) removing fluid from the cellulose to lay a cake,
  (iii) at least partially drying the cake,
  (iv) subjecting the cake to heat under pressure to form the membrane.

Preferably, step (iii) comprises partially but not completely drying the cake. It is also preferred that step (iv) comprises subjecting the cake to a temperature between 90° C. and 200° C., for example between 100° C. and 200° C. Preferably, step (i) is performed by defibrillation, such as by high-shear homogenisation or sonication of a fluid/cellulose mixture. Person skilled in the art will understand that defibrillation may be facilitated by chemical or enzymatic pre-treatments to reduce the energy consumption.

In certain embodiments, the method comprises a further step of applying a cross-linking agent to the membrane, e.g. after step (iv). In such embodiments, the method may further comprise the step of curing the membrane after the addition of the cross-linking agent. The preferred cross-linking agent is environmentally friendly and may comprise polycarboxylic acids, e.g. citric acid, cured under load at temperatures between 100° C. and 200° C. preferably in the presence of a catalyst such as sodium hypophosphate. The method may also include a step of washing and/or drying the membrane after the curing step.

In a further aspect, the invention provides a personal protective garment comprising a membrane according to the invention. The garment may be in the form of a mask.

In other embodiments, the invention provides for the use of a filtration membrane according to the present invention as an air filter.

The pore size distribution of the filtration membranes is derived from Barett-Joiner-Halenda (BJH) $N_2$ gas desorption analysis. The crystallinity of the cellulose is as measured by X-ray diffraction.

The invention provides virus removal membranes made from a single, 100% unmodified natural polymer from sustainable sources and featuring virus removal efficiency comparable or exceeding that of industrial synthetic or semi-synthetic polymers, preferably with log-reduction value (LRV)≥5 for large viruses and LRV≥3 for small viruses, while allowing for protein passage. Cellulose is a valuable industrial commodity thanks to its widespread availability in nature, renewability, mechanical strength, flexibility, inertness, and biodegradability. With respect to filtration applications, cellulose is attractive because it is inert, non-toxic, hydrophilic, resistant to pH between 2 and 11, thermally stable (i.e. can be sterilized by autoclaving), cost-efficient, and disposable.

Embodiments of the present invention may be useful in relation to separation of protein aggregates from singular proteins based on the size exclusion principle; removal of viruses from small-molecule size active pharmaceutical ingredients, including in relation to ophthalmic uses; removal of nanoparticles for medical use containing genetic material, which are sensitive to sterilization, including not only biological systems, e.g. viruses, but also artificially made gene delivery systems, e.g. polymeric nanoparticles, solid lipid nanoparticles and/or liposomes.

DESCRIPTION OF THE DRAWINGS

Embodiments of the present invention will now be described with reference to the following drawings.

DETAILED DESCRIPTION

Figure 1:
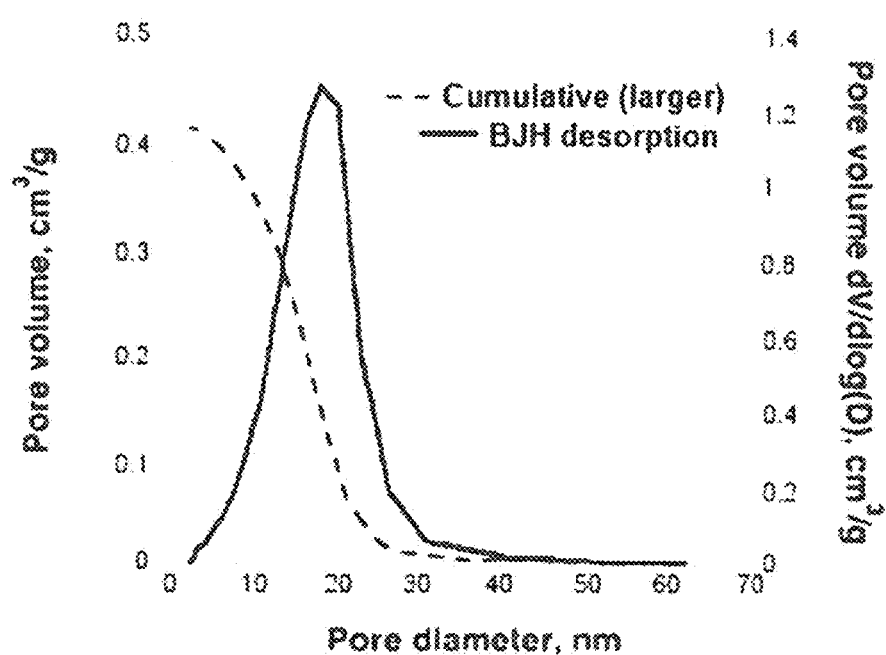
FIG. 1 shows a plot of BJH $N_2$ desorption profile of membrane according to the invention.

Embodiments of the present invention provide a cellulose based filtration membrane which presents a narrow pore size distribution such that it acts a barrier to the passage of viruses while allowing smaller species, such as proteins to pass through. It is preferred that the filtration membrane is formed from a material comprising cellulose extracted from algae such as a green filamentous algae including Cladophorales and Siphonocladales orders.

The characteristic features of cellulose nanofibers derived from these green filamentous algae is their high degree of crystallinity, viz.≥90% (as measured with XRD). The crystallinity index measured with XRD is calculated by using the following formula:

$$CrI = \frac{I_{22} - I_{18}}{I_{22}} \times 100$$

Where $I_{22}$ is the intensity of the peak at 22° and $I_{18}$ is the intensity of the background at 18°. Another characteristic property of highly crystalline cellulose from filamentous green algae are two well-resolved peaks at 14 and 16° as opposed to wood-type cellulose which shows a broad halo in this region. The high degree of crystallinity of cellulose from green filamentous algae is related to thick and stiff elementary fibrils, which are rectangular in shape and have a thickness of around 20-30 nm. For comparison, elementary fibrils from wood-type cellulose are only 4-5 nm in thickness. The peculiarities of solid-state structure of nanocellulose extracted from filamentous green algae are believed to be advantageous to produce porous type structures in the dry state—both as powder and sheets.

The filtration membranes of the present invention may have a modal pore diameter of less than 40 nm and preferably in the region of 10 to 25 nm. Furthermore, the filtration membrane preferably has pores whose diameter is smaller than 40 nm. In some embodiments, the maximum pore diameter is, for example, 35 nm or 30 nm. The pore size distribution of the filtration membranes is derived from Barett-Joiner-Halenda (BJH) $N_2$ gas desorption analysis.

The preferred cellulose has a high degree of crystallinity, for example in the region of 85% or greater crystallinity, e.g. around 90% or 95% or greater as measured by X-ray diffraction. The preferred cellulose may have elementary fibrils with a mean diameter greater than 10 nm, more preferably greater than 15 nm and most preferably greater than 20 nm, for example 20 to 30 nm.

The filtration membranes of the present invention allow, for example, protein solutions and other biological samples to pass therethrough with little or no effect on the component parts of that solution, while providing a barrier to the passage of viruses. Furthermore, the filtration membranes of the present invention provide sufficient wet strength to withstand pressure gradients required for fine filtration techniques.

The filtration membranes of the present invention may be prepared by a method whereby cellulose is obtained (for example from green filamentous algae including Cladophorales and Siphonocladales, as described above) and dispersed in water, using high-shear homogenisation or optionally with the aid of sonication. The dispersed sample may be collected on a porous support and the collected cellulose wet cake is allowed to dry at least partially. The cellulose product may then be removed from the support and dried by use of a hot press to form the filtration membrane.

It is particularly surprising that the use of a hot press provides a membrane having the characteristics of the present invention, i.e. of narrow pore size distribution. Hot presses are commonly used in papermaking with highly defibrillated cellulose from land-based plants to produce non-porous cellulose films with excellent gas barrier properties. It would be clear to the person skilled in the art that a non-porous film would not provide an effective filtration membrane. Alternatively, highly defibrillated cellulose from land-based plants may be rendered porous in the dry state by employing sophisticated, tedious and difficult to scale-up drying techniques, such as solvent-exchange/critical point drying or freeze-drying. The latter processes are energy intensive, thus costly, and may optionally involve flammable and/or hazardous organic solvents, which greatly limits their industrial utility.

The filtration membranes, as described above, may be used to remove viruses in the production of therapeutic proteins, for example, coagulation factors (such as for example Factor VIII, Factor IX, Factor XI, prothrombin complex or von Willebrand factor), immunoglobins, protease inhibitors, transferrin, interferons or haemoglobins.

Moreover, the filtration membrane of the invention may be used, for example, to remove viruses in the production of therapeutic proteins from transgenic plants (tobacco, tomato, potato, arabidopsis, rice, turnip, canola), such as for example protein C, hirudin, granulocyte-macrophage colony-stimulating factor, somathropin, erythropoietin, enkephalins, epidermal growth factors, interferons, serum albumin, hemoglobins, homotrimeric collagen, lactoferin, angiotensin-converting enzyme, α-tricosanthin, glucocerbrosidase.

Moreover, the filtration membranes of the invention may be used to remove viruses, for example, in the production of monoclonal antibodies in cell lines such as Chinese hamster ovary cell lines. In particular, the filtration membranes of the invention may be used for example to remove viruses in the production of recombinant proteins, such as for example anti-EGRF mAb, α-glucosidase, laronidase, Ig-CTLA4 fusion protein, N-acetylgalactosamine-4-sulfatase, luteinizing hormone, anti-VEGF mAb, Factor VIII (engineered), anti-IgE mAb, anti-CD11a mAb, α-galactosidase, interferons, erythropoietin (engineered), anti-CD52 mAb, tissue plasminogen activator (engineered), anti-HER2 mAb, TNFα fusion, factor IX, follicle stimulating hormone, antiCD20 mAb, glucocerbrosidase, dexyribonuclease I, tissue plasminogen activator.

Additionally or alternatively, the filtration membranes of the present invention may be used, for example to remove viruses, in the production of proteins derived from milk of transgenic mammal, for example human antithrombin III. The filtration membranes may also be used to remove virus related particles from process streams from manufacturing processes, which employ viruses as biological expression systems, for example vaccine manufacturing processes.

It is also envisaged that the filtration membranes may be used to remove from a fluid PrPs, which may induce pathologies such as Creutzfeldt-Jakob disease, variant Creutzfeldt-Jakob disease, bovine spongiform encephalopathy, Kuru disease, ovine scrapie, Alpers syndrome, fatal familial insomnia or Gerstmann-Strassler-Scheinker syndrome. For example, such PrPs could be removed in the uses described above.

It is preferred that membranes for use in the removal of PrPs have a maximum pore diameter of 35 nm or less. It is more preferred that membranes for use in the removal of PrPs have a maximum pore diameter of 30 nm or less, for example 25 nm or less, 20 nm or less or 15 nm or less.

In a further embodiment, the filtration membranes of the present invention may be used to isolate viral particles such that they may be used, for example, in biopharmaceutical applications and/or research such as in relation to therapeutic gene delivery.

The present invention will be further described by reference to the following non limiting examples.

Example 1

About 300 mg of *Cladophora* cellulose was dispersed in deionized water using high-shear ultra sonic treatment (750 W; 20 kHz; 13 mm probe; Vibracell, Sonics, USA) for 10 minutes at 71% amplitude. The dispersed sample was then drained on a nylon filter having an average pore size distribution of 100 nm (R01SP09025; 90 mm; GE Water and Process Technologies).

The collected cellulose mass was allowed to dry until slightly damp—just enough to allow the hydrogen bonds to form a coherent layer. Subsequently, the nylon support was then easily delaminated using tweezers without affecting the integrity of the cellulose layer.

The sample was then dried completely under load using a heat-press (Rheinstern, Germany) at 105° C. to produce a flat paper sheet. The produced paper sheet was 70 µm thick, 26 mm in diameter and had total porosity of 37%. The porosity was measured by BJH $N_2$ desorption analysis. The results are shown in the graph in FIG. 1.

A suspension (5 µl) of uniform polystyrene latex beads (2.5% solids) was diluted in 10 ml of water. The particle size of latex beads was 500, 100, and 30 nm, respectively. The diluted dispersion was filtered through the *Cladophora* cellulose membrane in a Büchner funnel at a suction pressure of 10-15 kPa.

Figure 2:
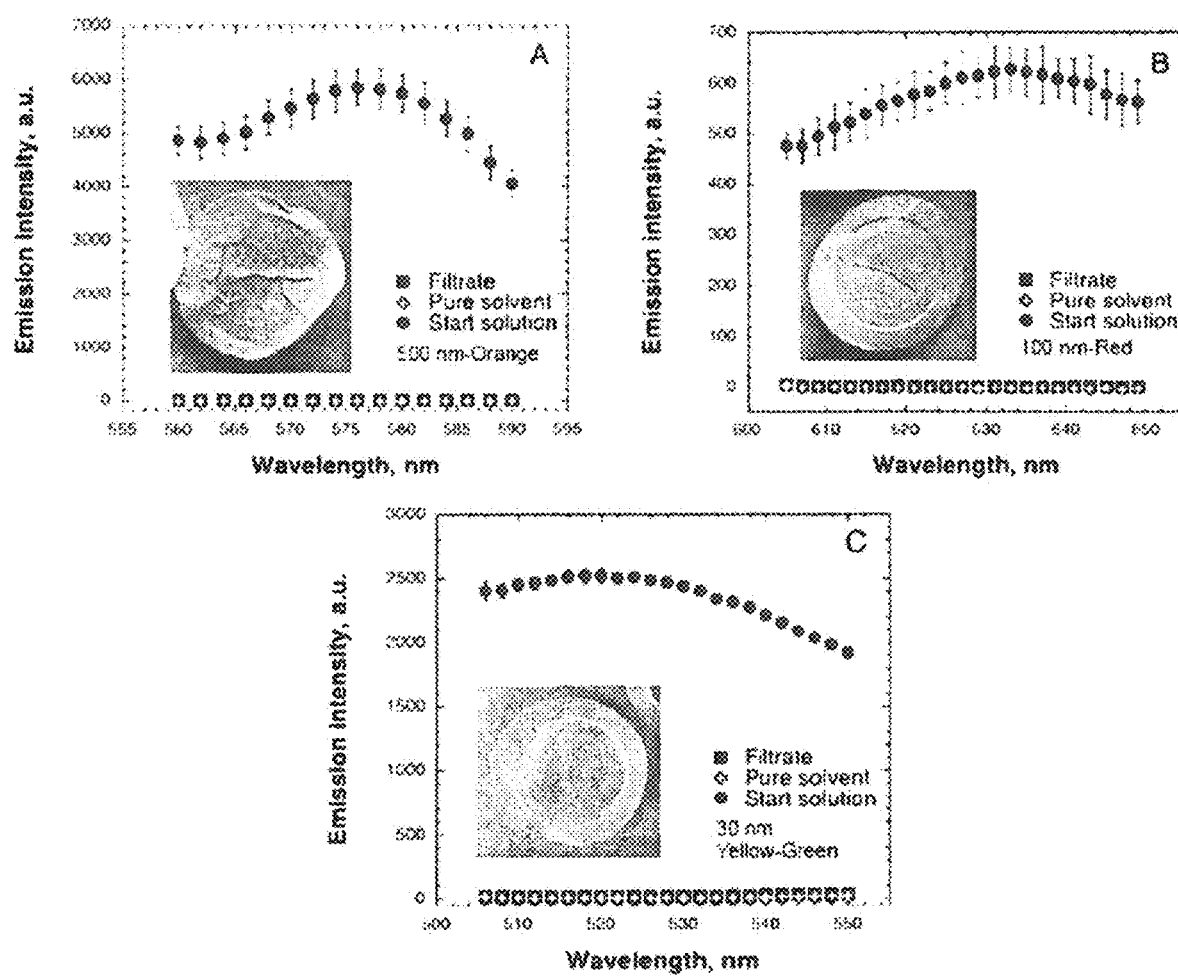
FIG. 2 shows fluorospectrophotometric profiles of the starting fluorophore tagged polystyrene (PS) latex bead dispersions and the filtrate produced according to the method of the invention: (a) 500 nm beads; (b) 100 nm beads; and (c) 30 nm beads. The results are the average of three measurements. The inserts represent photographs of the *Cladophora* membranes following the filtration.
Figure 3:
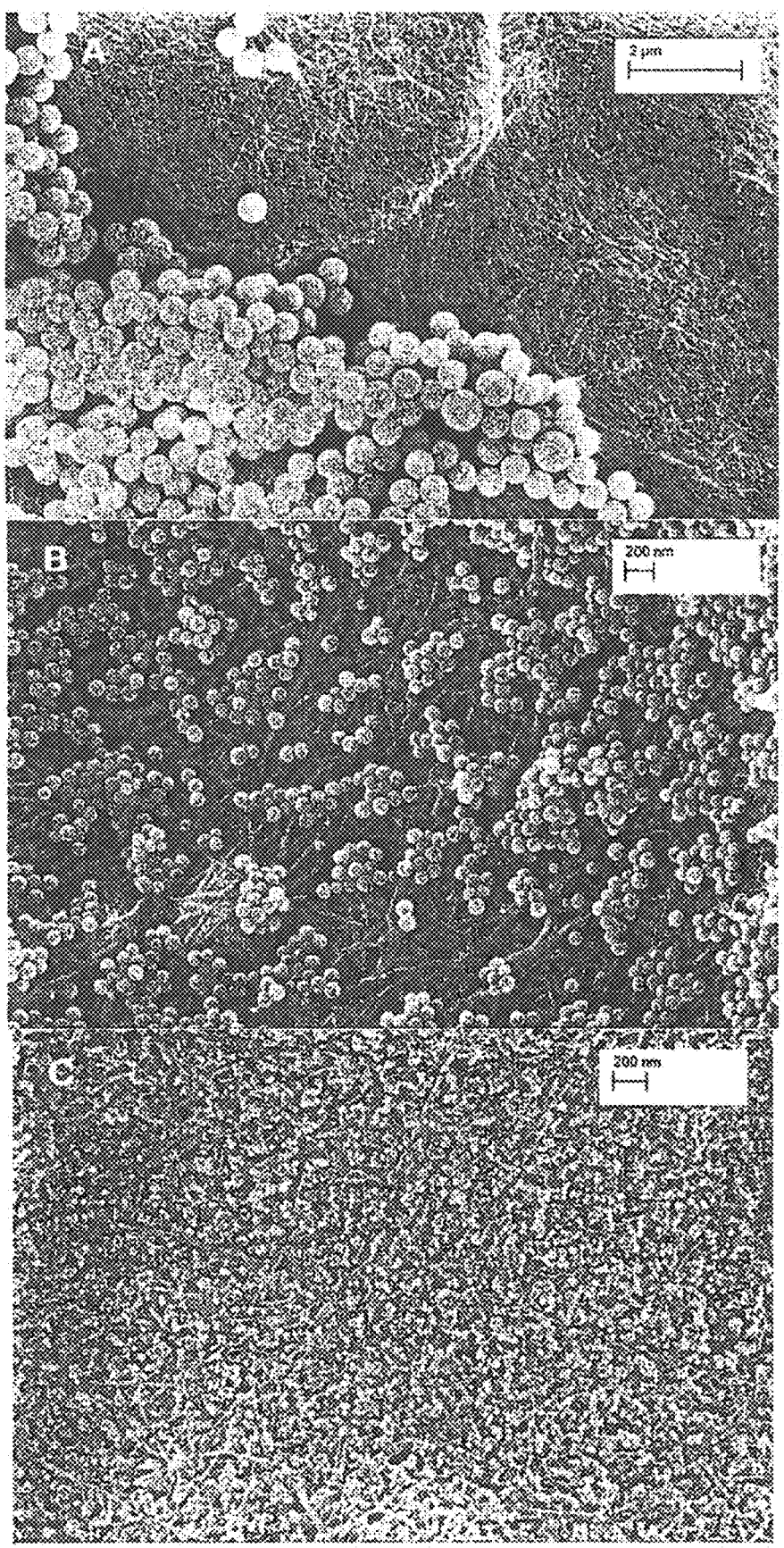
FIG. 3 shows SEM images of PS latex beads following filtration on *Cladophora* cellulose paper filter according to the invention: (a) 500 nm beads; (b) 100 nm beads; (c) 30 nm beads.
Figure 4:
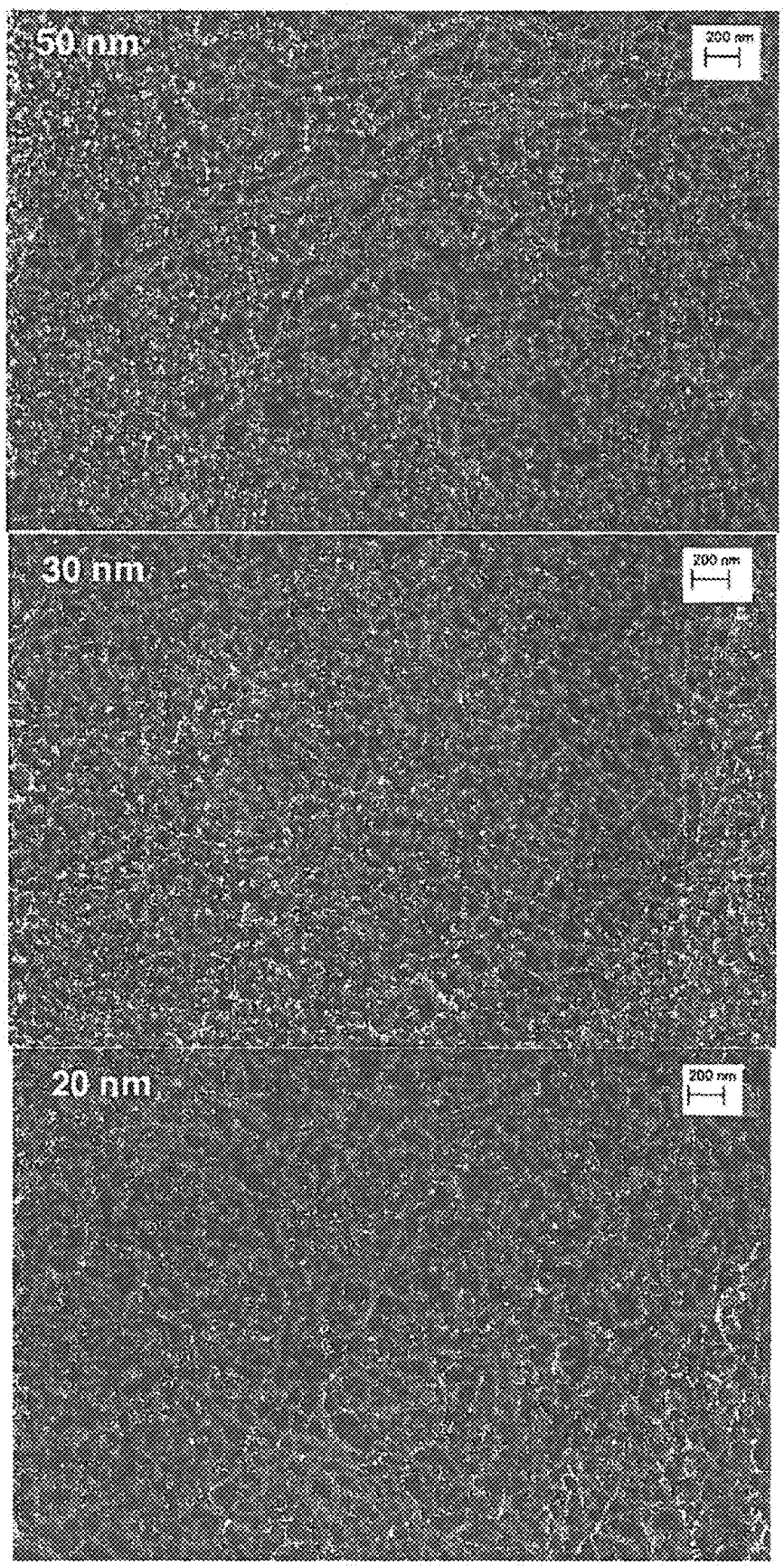
FIG. 4 shows SEM images of Au nanoparticles (NPs) following filtration on *Cladophora* cellulose paper filter according to the invention: (a) 50 nm beads; (b) 30 nm beads; (c) 20 nm.
Figure 5:
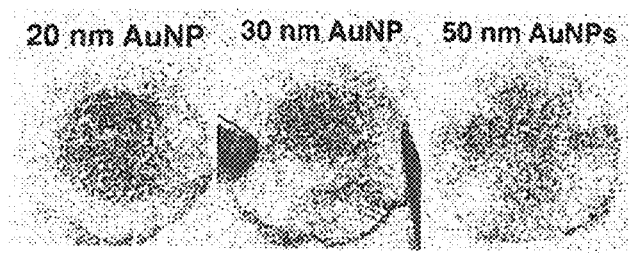
FIG. 5 shows photographs of Au NPs following filtration on *Cladophora* cellulose paper filter according to the invention: (a) 50 nm beads; (b) 30 nm beads; (c) 20 nm.

The filtrate was collected and the fluorescence intensity was measured using a fluorospectrophotometer (Tecan Infinite M200, Austria) at the specified excitation and emission wavelengths. The intensity of the filtrate was similar to that of pure water (as shown in FIG. 2). SEM analysis verified the presence of screened latex particles on the surface of nanocellulose-based filter paper, as shown in FIG. 3.

Example 2

Filtration membranes were prepared according to the method in Example 1. The membranes were then sterilised in an autoclave at 121° C. for 20 min. Swine influenza viruses A (SIV A, 80-120 nm) were propagated as described in Virus Genes 2011, 42, 236 Matreveli et al to produce a stock solution.

A feed solution was produced by diluting the stock solution $10^{-1}$ with phosphate buffered saline (PBS). Twenty (20) ml of the produced SIV feed solution was filtered through *Cladophora* cellulose membrane (26 mm in diameter) in a Büchner funnel. The suction pressure was adjusted to 10-15 kPa, and the filtrate was subsequently collected. Another 10 ml of the diluted SIV feed solution was frozen in −70° C. to be used as the hold-control to measure the factual virus litre in the feed.

The SIV titre was analysed by the end-point titration through cytopathogenic effect (cpe). Standard 96-well plates containing MDCK cells were used in tenfold dilutions by assaying eight replicates of 50 µl per dilution. Negative controls were EMEM-trypsin and PBS-trypsin. The virus titres after 8 days were calculated according to Karber and expressed as $\log_{10}$ tissue culture infectious dose $TCID_{50}$ $ml^{-1}$. The results of the titres of the stock, feed and filtrate solutions are shown in Table 1, below. No infectious SIV particles were found in each of the triplicate 96-well plates in the filtrate. The corresponding virus removal probabilities are then LRV≥5.2 or LRV≥6.3 depending on the $\log_{10}$ titre value of the feed solution. For large viruses, i.e. viruses, with particle size≥50 nm, the state of the art industrial filters exhibit LRV≥6-7.

TABLE 1

$TCID_{50}$ titres in $\log_{10}$ $ml^{-1}$ with calculated LRV for the SIV retention test.

| | Titre $\log_{10}$ $ml^{-1}$ | LRV $ml^{-3}$ |
|---|---|---|
| Stock | 7.2 ± 0.4 (n = 3) | na[b] |
| Feed (diluted) | 6.0 ± 0.3 (n = 3) | na[b] |
| Filtrate | ≤0.8[a] | ≥5.2 ± 0.3 |
| Stock | 7.2 (n = 1) | na[b] |
| Feed (undiluted) | 7.1 (n = 1) | na[b] |
| Filtrate | ≤0.8[a] | ≥6.3 |

[a]non-detectable;
[b]na = non-applicable

Example 3

Filtration membranes according to Example 1 were prepared. Prior to the virus retention test, the membranes were sterilised in an autoclave at 121° C. for 20 min. A solution spiked with Murine leukemia virus (MuLV), particle size 80-110 nm, was used as a model. A volume of 7.5 ml having log 10 total virus load of 5.43±0.27 was filtered. No cytopathogenic effect was detected in the filtrate fraction. LRV≥5.25 was calculated according to the Kärber's method.

Example 4

Filtration membranes according to Example 1 were prepared. The pore size mode of the functional nanocellulose layer was centered around 11 nm as obtained by BJH $N_2$ gas desorption analysis. The functional nanocellulose filtration layer was then laminated on an ordinary filter paper acting as support. A suspension (500 µl) of standard Au nanoparticles (50, 30, 20 nm stabilised with 0.1 mM PBS) was diluted in 10 ml of water and then filtered through the 2-layer nanocellulose filter paper in a Büchner funnel with the suction pressure gradient of 37 kPa.

The filtrate solution was collected, and its UV intensity was measured using a spectrophotometer (Tecan infinite M200, Austria) at in the region between 450 and 650 nm. The intensity of the filtrate solution was insignificantly different from that of pure water. The efficiency of filtration was verified by visual inspection of the 2-layer filter paper: dark red-blue precipitate was clearly seen. The scanning electron microscopy analysis also confirmed the interception of Au nanoparticles by the paper filter (see FIG. 4).

Example 5

Filtration membranes according to Example 1 were prepared. The sample was then cross-linked with polycarboxylic acid to enhance the wet strength properties. The prepared paper filter was soaked in 16% wt citric acid solution in presence of 1% sodium hypophosphate overnight before being cured at 160° C. under load using a heat-press (Rheinstern, Germany) for 10 min. The cured filter paper was then dialysed in water to remove unreacted chemicals and then dried again in a heat-press at 100° C. to produce the final flat paper sheet.

The wet (tensile) strength was improved 10-fold (from about 2 to 20 MPa) and the strain to failure value was improved by 60% (from 1.6 to 2.2%). Pore size mode of the cross-linked nanocellulose membrane was centered around 15 nm as obtained by BJH $N_2$ gas desorption analysis.

The filtering properties were tested using a feed solution spiked with 20 nm Au nanoparticles. A suspension (500 µl) of standard Au nanoparticles (20 nm stabilised with 0.1 mM PBS) was diluted in 10 ml of water and then filtered through the nanocellulose membrane in a Büchner funnel with the corresponding suction pressure gradient of 37 kPa. The filtrate solution was collected, and its UV intensity was measured using a spectrophotometer (Tecan Infinite M200, Austria) at in the region between 450 and 650 nm. The intensity of the filtrate solution was insignificantly different from that of pure water. The retention of 20 nm Au nanoparticles was clearly detectable by visual observation of the paper filter (see FIG. 5) following the filtration by characteristic dark red-blue precipitate.

Example 6

A filtration membrane according to Example 4 was prepared. A suspension (1000 µl) of standard Au nanoparticles (nominal size 5 nm stabilised with 0.1 mM PBS; Sigma Aldrich, product number 752568-25ML) was diluted in 50 ml of water and then filtered through the pressure gradient of 300 kPa. The filtrate solution was collected, and its UV intensity was measured using a spectrophotometer (Tecan Infinite M200, Austria) at in the region between 450 and 650 nm. The intensity of the filtrate solution was insignificantly different from that of pure water. The efficiency of filtration was verified by visual inspection of the 2-layer filter paper:

dark red-blue precipitate was clearly seen. As such, it appears that the membrane is suitable for removing very small particles. As such, the membrane could be used to remove, say, PrPs from a fluid.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A filtration membrane comprising a paper formed from cellulose fibres, the cellulose fibres comprising elementary fibrils of diameter greater than 10 nm, the membrane having a pore size distribution such that the modal pore diameter is between 10 nm and 25 nm and/or wherein less than 5% of the pore volume comprises pores of greater than 40 nm; wherein the pore size distribution is determined according to BJH desorption analysis.

2. A filtration membrane according to claim 1 wherein the cellulose fibres are derived from green filamentous algae.

3. A filtration membrane comprising cellulose fibres derived from green filamentous algae, the membrane having a pore size distribution such that the modal pore diameter is between 10 nm and 25 nm and/or wherein less than 5% of the pore volume comprises pores of greater than 40 nm.

4. A filtration membrane according to claim 3, wherein the cellulose fibres have elementary fibrils of diameter greater than 10 nm.

5. A filtration membrane according to claim 1, wherein at least half of the cellulose fibres have a degree of crystallinity greater than 90%.

6. A filtration membrane comprising cellulose fibres, at least half of the cellulose fibres having a degree of crystallinity greater than 90%, the membrane having a pore size distribution such that the modal pore diameter is between 10 nm and 25 nm and/or wherein less than 5% of the pore volume comprises pores of greater than 40 nm.

7. A filtration membrane according to claim 6 wherein the cellulose fibres are derived from green filamentous algae.

8. A filtration membrane according to claim 6, wherein the cellulose fibres have elementary fibrils of diameter greater than 10 nm.

9. A filtration membrane according to claim 1, wherein at least half of the cellulose fibres are derived from algae Cladophorales and/or algae Siphonocladales.

10. A filtration membrane according to claim 1, wherein at least half of the cellulose comprises elementary fibrils having a diameter greater than 15 nm.

11. A filtration membrane according to claim 1, wherein the modal pore diameter is between 10 nm and 25 nm.

12. A filtration membrane according to claim 1 wherein the membrane has a porosity of greater than 10%.

13. A filtration membrane according to claim 1, wherein the cellulose fibres are modified by a cross-linking additive.

14. A method of removing particles from a feed fluid, the method comprising passing the feed fluid through a filtration membrane, said filtration member comprising
a paper formed from cellulose fibres, the cellulose fibres comprising elementary fibrils of diameter greater than 10 nm, the membrane having a pore size distribution such that the modal pore diameter is between 10 mn and 25nm and/or wherein less than 5% of the pore volume comprises pores of greater than 40 nm; wherein the pore size distribution is determined according to BJH desorption analysis; and
retaining at least a portion of the particles on the membrane and produce a filtrate containing a lower concentration of the particles than the feed fluid.

15. A method according to claims 14, wherein the particles have a diameter greater than 10nm.

16. A method according to claims 14, wherein the particles comprise microorganisms such as viruses.

17. A method according to claims 14, wherein the method provides a particle removal probability log reduction value (LRV) of greater than 1.

18. A method according to claim 14 wherein the particles comprise proteins such as protein aggregates and/or protein prion particles.

19. A method according to claim 16 wherein the fluid is passed through the membrane under a pressure differential of approximately 10 to 600 kPa.

20. A method of manufacturing a filtration membrane according to claim 1, the method comprising:
  (i) dispersing cellulose in a fluid,
  (ii) removing fluid from the cellulose to lay a green membrane,
  (iii) at least partially drying the cake,
  (iv) subjecting the cake to heat under pressure to form the membrane.

21. A method according to claim 20 wherein step (iv) comprises subjecting the cake to a temperature above 90° C.

22. A method according to claim 20, wherein step (i) is performed by defibrillating the cellulose.

23. A method according to claim 20 comprising a further step of applying a cross-linking agent to the membrane.

24. A filtration membrane according to claim 1, wherein at least half of the cellulose fibres are derived from algae *Cladophora* species.

25. A filtration membrane according to claim 1, wherein at least half of the cellulose comprises elementary fibrils having a diameter between 20 nm and 30 nm.

26. A filtration membrane according to claim 1, wherein the modal pore diameter is between 10 nm and 20 nm.

27. A filtration membrane according to claim 1 wherein the membrane has a porosity of greater than 20%.

* * * * *